No. 837,883. PATENTED DEC. 4, 1906.
A. L. J. QUENEAU.
METALLURGICAL VESSEL.
APPLICATION FILED APR. 18, 1905.
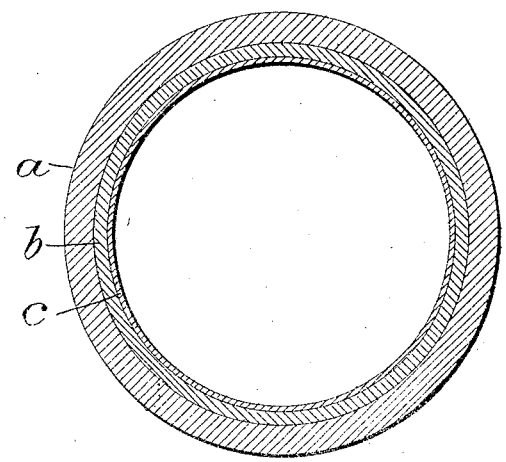
Witnesses:
E. C. Schuermann.
H. M. Watson
Inventor.
A. L. J. Queneau,
by Penmie & Goldsborough,
Attys

UNITED STATES PATENT OFFICE.

AUGUSTIN L. J. QUENEAU, OF SOUTH BETHLEHEM, PENNSYLVANIA, ASSIGNOR TO NEW JERSEY ZINC COMPANY, OF NEW YORK, N. Y., A CORPORATION OF NEW JERSEY.

METALLURGICAL VESSEL.

No. 837,883.     Specification of Letters Patent.     Patented Dec. 4, 1906.

Original application filed May 21, 1904, Serial No. 209,138. Divided and this application filed April 18, 1905. Serial No. 256,295.

*To all whom it may concern:*

Be it known that I, AUGUSTIN L. J. QUENEAU, a citizen of the Republic of France, residing at South Bethlehem, county of Northampton, State of Pennsylvania, have invented certain new and useful Improvements in Metallurgical Vessels; and I do hereby declare the following to be a full, clear, and exact description of the invention, such as will enable others skilled in the art to which it appertains to make and use the same.

In Letters Patent of the United States No. 789,451, dated May 9, 1905, I have described the production of metallurgical vessels by a method therein set forth and claimed, said method, briefly stated, consisting in supplying a press-mold with a composite wad made up of contiguous hammered wads of different compositions and then compressing the constituent wads into intimate and homogeneous contact to form the completed vessel.

I preferably make use of the same method for the production of the metallurgical vessel described in the present application, which vessel consists of a portion or layer having as one of its constituents graphite or some other carbonaceous substance and having an outer layer of a material which will protect the carbonaceous element from the oxidizing action of the products of combustion to which the metallurgical vessel is subjected during the kiln-tempering operation and during its subsequent use for metallurgical purposes.

The accompanying drawing illustrates in cross-section a metallurgical vessel embodying my invention.

Referring to the drawing, *b* indicates the portion of the metallurgical vessel containing the carbonaceous element, which may be, for instance, in the form of finely-comminuted graphite suitably mixed with fire-clay and sand to form the desired wad or which may consist of some other material containing carbon (either alone or in combination) of such character that the oxidizing action of products of combustion would tend to burn it out, leaving the outer surface in a pitted or porous condition. To prevent this pitting of the carbonaceous portion of the metallurgical vessel, I provide the vessel with an interior layer *c* of fire-clay and sand and an exterior layer *a* of like protective material. The inner layer may conveniently be relatively thin, as illustrated in the drawing, for the reason that its function is to protect the interior of the vessel during the kiln-tempering operation, at which time the oxidizing products of combustion not only play around the outside of the vessel, but also enter its interior. The subsequent use of the vessel in metallurgical operations is usually restricted to conditions wherein only the exterior surface of the vessel is subjected to the action of products of combustion, and for this reason I preferably make the exterior protective coating of considerably-increased thickness, so as to insure its greater durability. It will also be understood that in some instances I may omit the inner coating of protective material where the particular conditions of kiln-tempering or the character of the carbonaceous mixture employed render the danger of pitting on the interior surface of the vessel of less importance.

It will of course be understood that I do not confine myself to comminuted graphite as the carbonaceous element of the protected layer, but intend to include other forms of carbon or carbonaceous compounds whose oxidation by the products of combustion would leave the layer in a pitted condition if unprotected.

Having thus described my invention, what I claim is—

1. A metallurgical vessel, whose walls are made up of a layer containing carbon as one of its constituents, and an outer layer of a material adapted to protect the carbon from the oxidizing action of the products of combustion, said outer protective layer being applied to both the exterior and interior surfaces of the vessel; substantially as described.

2. A metallurgical vessel, whose walls are made up of a layer containing carbon as one of its constituents, and an outer layer of a material adapted to protect the carbon from the oxidizing action of the products of combustion, said outer protective layer being applied to the exterior of the vessel; substantially as described.

3. A metallurgical vessel, whose walls are made up of a layer consisting of comminuted graphite, fire-clay and sand, and a protective layer of fire-clay and sand; substantially as described.

In testimony whereof I affix my signature in presence of two witnesses.

AUGUSTIN L. J. QUENEAU.

Witnesses:
 FRANCIS S. MAGUIRE,
 JOHN C. PENNIE.